United States Patent [19]

Erickson, Sr. et al.

[11] 4,125,882
[45] Nov. 14, 1978

[54] DISC FILE SYSTEM WITH IMPROVED SEEK CONTROL

[75] Inventors: Robert W. Erickson, Sr.; Robert W. Erickson, Jr., both of Pacific Palisades, Calif.

[73] Assignee: PerSci, Inc., Marina Del Rey, Calif.

[21] Appl. No.: 809,087

[22] Filed: Jun. 23, 1977

[51] Int. Cl.$^2$ .............................................. G11B 5/52
[52] U.S. Cl. ..................................................... 360/78
[58] Field of Search ..................... 360/77, 78; 318/640, 318/653, 686

[56] References Cited

U.S. PATENT DOCUMENTS

| | | | |
|---|---|---|---|
| 3,449,735 | 6/1969 | Cogar | 360/78 |
| 3,699,555 | 10/1972 | Du Vall | 360/78 |
| 3,800,317 | 3/1974 | Lin | 360/78 |

*Primary Examiner*—John H. Wolff

*Attorney, Agent, or Firm*—Smyth, Pavitt, Siegemund, Jones & Martella

[57] ABSTRACT

The disc file system being improved includes a motor driven transducer carriage for positioning the transducer in selected cylinder positions. A command unit issues step pulses and the carriage provides detent pulses respectively representing the number of tracks (cylinders) to be and being crossed when the carriage is caused to move and moves from one cylinder position to another one. These pulses are processed so that overlap is avoided in that following the trailing edge of each step or detent pulse, a process pulse, is produced either with or without delay depending on the need to avoid conflict. The process pulses to be produced are up an down counted for tracking actual carriage movement, and the total count is zero when the carriage has arrived at the desired position.

5 Claims, 6 Drawing Figures

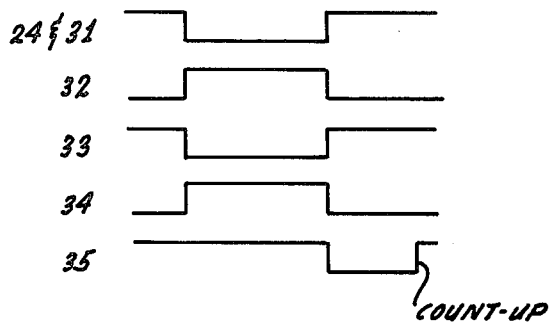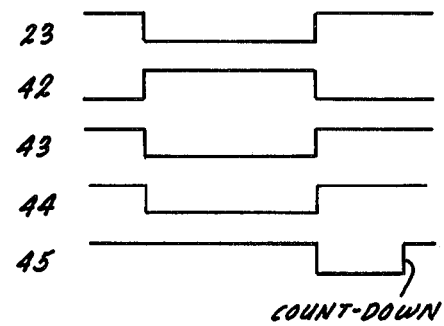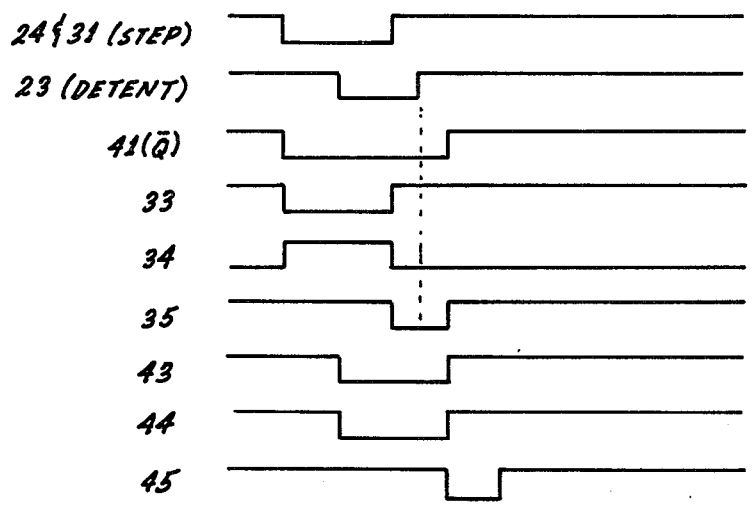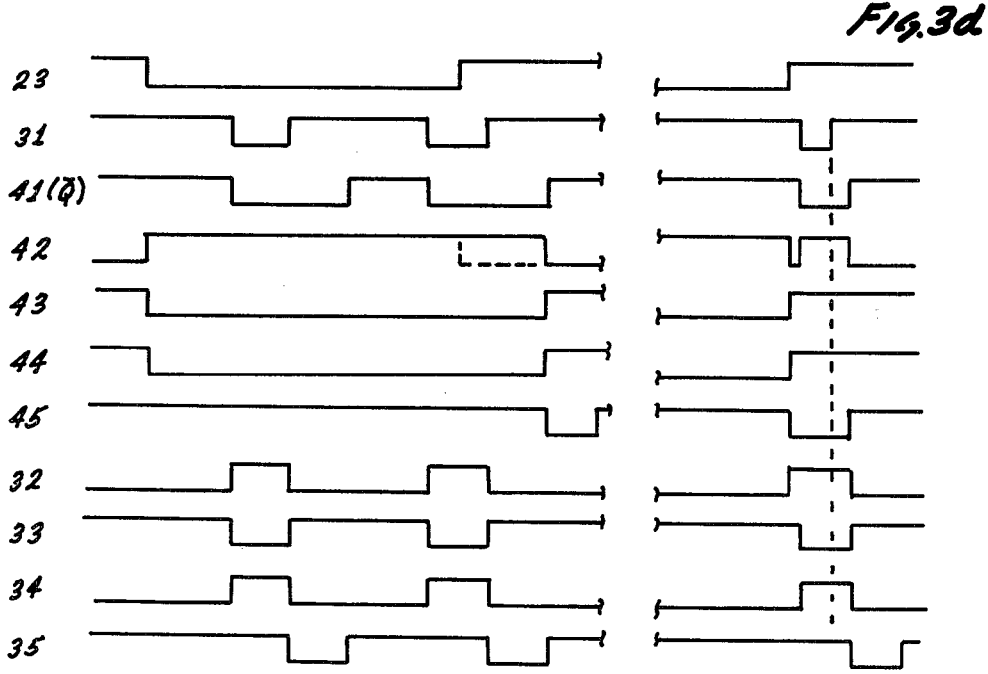

DISC FILE SYSTEM WITH IMPROVED SEEK CONTROL

BACKGROUND OF THE INVENTION

The present invention relates to improvements in disc file systems and, more particularly, the invention relates to improving the accuracy of seek operations within such disc file system.

Disc file systems forms an important portion in computer systems, terminals, minicomputers, or the like. As a whole, they constitute memory extensions and in- and output equipment for the main frame of such a facility. Usually, the disc file system includes at least one disc with a magnetic coating on one or both sides, and if the system is of the movable arm variety, a transducer or transducer assembly can be positioned in selected radial distances from the center of rotation of the disc surface. The transducer as so positioned cooperates and electromagnetically interacts with a particular track, also called a cylinder if the particular system includes plural discs or disc packs. Moving the transducer with its arm into alignment with a different track requires usually rapid actuation and movement of the transducer carrier in radial direction to or from the center of rotation. This operation is commonly referred to as a seek operation.

One or more such disc files, each having a single linear motor for moving the transducer or transducer assembly are usually connected to a command or control unit which, on one side, interfaces with the computer or other digital equipment facility for receiving and accepting data for purposes of disc storage. Data retrieved from a disc file pass also through the control or command unit, usually for storage in a random access storage device of the computer, terminal, etc.

In addition, the control or command unit will receive control signals for purposes of initiating the necessary accessing operation to a particular cylinder. The control or command unit, on the other hand, provides for the particular control of one or more of such disc files, including the necessary seek operation.

In order to move the or a transducer to a different position pursuant to such a seek operation, the control and command unit will issue particular signals to be used in and by the control circuit for the linear motor in order to move the transducer or transducer assembly from one particular position to another particular position. It is, of course, apparent that these positions are very accurately defined and the motion must be carried out with an accuracy commensurate with the track spacing and width.

Various control circuits for such accurate position control are known including also rapid movement control for the transducer to effect a change in track alignment or cylinder position as fast as possible. These control circuits work basically in feedback loops in that in one form or another the current position of the transducer is being tracked during the radial movement. Output signals are produced representing in each instance the exact cylinder position of the transducer and arm assembly. The span to be covered as between old and new cylinder position is also commonly referred to as cylinder difference. This difference is provided by the command unit and will serve basically as a command input for the feedback control. The position signals of the transducer are fed back to the control circuit and, in effect, represent in any instant how the seek command is being carried out.

It is common practice to have the control circuit process the cylinder difference signal and the feedback signal so that the transducer will be moved into the exact position. In simpler disc files, by way of example, the cylinder difference is commanded by a train of pulses, the exact number of which represents the cylinder difference, and a directional component or signal is furnished separately to determine the direction of movement from the current cylinder position. The transducer carriage cooperates with some form of grating which is being scanned in one form or another in representation of the position and change in position of the transducer head assembly. Each pulse may, for example, represent passage of the transducer assembly across one track. Ultimately then, it is necessary that the transducer head assembly passes over the same number of tracks which was previously commanded by the number of pulses issued by the command unit representing the cylinder difference to be sought. The control circuit, therefor, is generally designed for processing these two pulse trains and to extract therefrom command signals for the motor control circuit proper so that the transducer carriage motor is stopped precisely after that number of tracks has been crossed.

The two pulse trains in question now occur with respect to each other completely asynchronously. Moreover, it is to be expected that the feedback pulses, often also referred to as detent pulses, vary greatly in length and rate because the linear motor moves in a non-constant speed for moving the transducer head from one cylinder position to another. Particularly for obtaining a position change in the shortest possible time, one will accelerate the linear motor for half of the tracks to be crossed and brake for the remainder. Thus, the feedback or detent pulses, representing position and position changes, will be of long duration, and will occur relatively far apart at the beginning and towards the end of the actual transducer movement while the feedback or detent pulses appear in a very rapid rate, in about the middle of such a position change operation. On the other hand, the pulses issued by the command unit and representing the cylinder difference in execution of the seek command will normally be quite uniform and will appear at a particular constant rate. These pulses are also referred to as step pulses. However, in order to have greater versatility as far as adapting disc files and command units to each other, it is also conceivable that these step pulses occur one at the time or irregular.

It can readily be seen that the step pulses, that is the cylinder difference command pulses, and the feedback or detent pulses, will overlap, and since they are to be used within the same circuit any overlaps and mutual interference is quite possible, unless particular provisions are being taken.

As far as processing these pulses is concerned, one may proceed as follows. The cylinder difference command or step pulses are counted, for example, upcounted. The detent pulses are subtracted from that count result, and the transducer has arrived at the desired cylinder position, when the count result has been reduced to zero. It is obviously imparitive that these two count processes must not interfere, and that every single pulse is, in fact, accounted for. This has posed difficulties in the past and significant constraints have been called for with regard to the relation and timing to these pulses.

DESCRIPTION OF THE INVENTION

It is an object of the present invention to improve the seek operation in a disc file system, particularly as far as the processing of asynchronously occurring command (step) pulses and detent or feedback pulses is concerned.

It is a particular object of the present invention to improve the pulse accepting circuitry for function generators which provide velocity profile signals for purposes of controlling a transducer carriage motor during seek operations in a disc file, so that in response to a specific cylinder command represented by a train of digital pulses, the transducer will be positioned exactly over the desired new track and cylinder.

It is, therefore, a specific object of the present invention to improve disc file systems which are to be connected to a control or command unit and receiving and issuing data respectively to be stored on and retrieved from a disc or discs in the disc file system, which disc system includes, furthermore, at least one motor driven carriage for one or several transducer, being radially movable in reference to a disc for alignment with annular tracks or cylinders and whereby the control or command unit issues pulses into a particular control line in representation of track or cylinder differences while feedback or detent pulses are provided in response to passage of the transducer across the several tracks on the disc surface.

In accordance with the preferred embodiment of the present invention, it is suggested to provide for controlled movement of the transducer in response to a command signal, including halting such movement when the transducer has arrived above the desired track. Separate circuit means are connected with the particular control line of the command or control unit and are further connected to the transducer moving system, for respectively receiving control line pulses (or step pulses), and pulses which represent the position and movement of the transducer (also called detent pulses). The circuit means now provides process pulses in response to and following the trailing edges of each step pulse and of each detent pulse. A blocking circuit provides a blocking signal that begins with the leading edge of each control line or step pulse and ends with the trailing edge of process pulse generated in response to such control line or step pulse. The production of a process pulse in response to the trailing edge of a transducer position or detent pulse is delayed, if such trailing edge occurs during the blocking period, and the delay lasts until the end of that blocking period.

It can, thus, be seen that process pulses are produced exclusively following the trailing edge of a step pulse. The process pulses may be delayed following the trailing edge of a detent pulse, if the production of a process pulse is in progress. It may be practical and reasonable to select the process pulses to be not longer than the shortest control line or step pulse from the command unit. This is a relatively insignificant constraint, particularly because the duration of these process pulses is readily adjustable, while interface specification for command or control units as to the shortest duration of the step pulses is readily available. It can never occur in such a case that a step pulse beginning during the production of a process pulse in response to the trailing edge of a detent pulse, will interfere with the production of that latter process pulse, simply because the trailing edge of that particular process pulse will positively have occurred before the leading edge of the process pulse following that step pulse can possibly occur. If, however, even that constraint is deemed too severe, it may be desirable to include additional circuit means to provide an additional blocking signal for the duration of the production of a process signal following the trailing edge of a detent pulse, and to delay the production of any process pulse in response to a step command pulse, if the trailing edge of the latter should occur within that period.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 3a through 3d are pulse and signal diagrams for explaining the operation of the device in FIG. 2.

Proceeding now to the detailed description of the drawings, FIG. 1 shows the basic environment for practicing the invention, which is comprised, for example, of a control or command unit 10 which may pertain to or interfaces with a general purpose digital computer; the circuit illustrated in FIG. 1 constitutes a portion of the input-output system of that computer. The command unit 10 may be provided to service and control one or several disc drives such as 11, each disc drive including, for example, one or more magnetic recording discs onto which data are recorded for subsequent retrieval. These disc drives 11 may be provided with hard surface or floppy discs.

Figure 1:
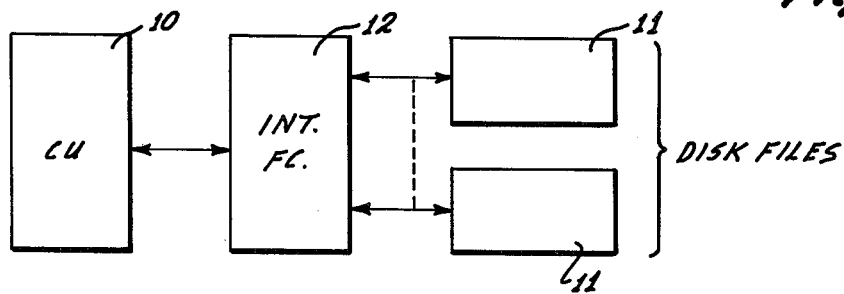
FIG. 1 is a block diagram explaining the environment of practicing the preferred bodiment of the invention.

Reference numeral 12 refers to the interface structure which in reality may pertain in parts to the command unit 10 and in parts to the drive 11. Data as well as command and control signals pass across that interface involving the command unit 10 and the particular disc drive being used in any instant. The interface, therefore, includes one or more data lines depending on the format of presentation of data, and various command lines depending on the type of system being used. The invention can be practiced with a variety of such disc systems, but is particularly applicable to smaller or more economic type systems.

For purposes of explaining the invention, all of the interface structure does not have to be explained, only the particular portions relevant to the preferred embodiment are explained with reference to FIG. 2.

Figure 2:
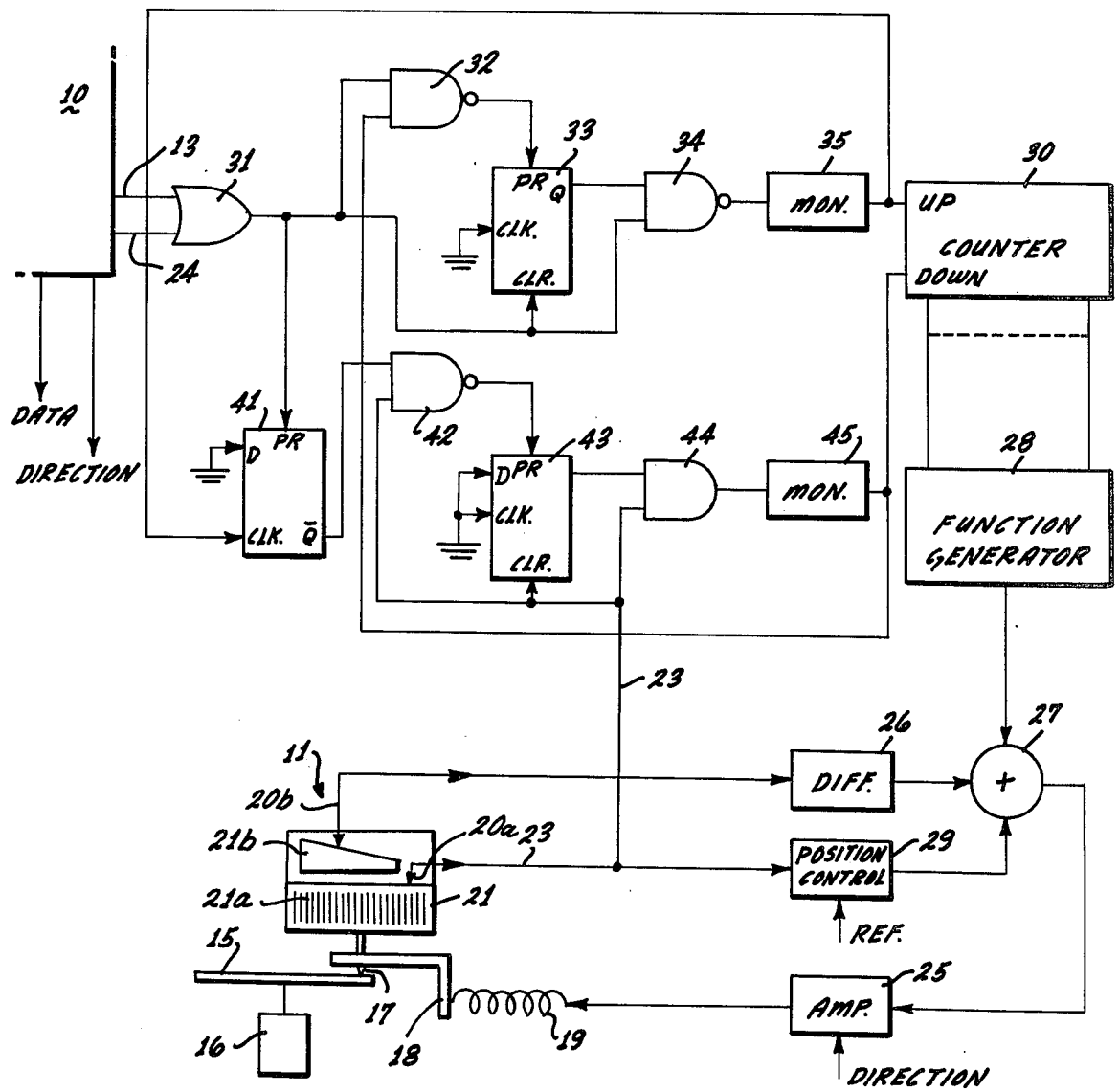
FIG. 2 is a more detailed block diagram of a circuit in which the preferred embodiment of the invention is practiced.

In FIG. 2 there is illustrated a part of a single disc drive 11 which is comprised of a spinning disc 15, driven continuously by a spindle motor 16 during normal operation. A magnetic transducer or transducer system 17 is provided on a movable carriage 18, being driven by a voice coil motor 19.

The transducer 17 is appropriately connected to electronic circuitry (read/write electronics, not shown) which, in turn, is connected to the data lines being one of the interface lines from control or command unit 10 to the several drives. The read and write operation is not part of the invention and does not require elaboration.

The voice coil motor 19 positions the transducer of transducer assembly 17 in a particular radial position to the center axis of disc 15 and, thereby, cooperates with a particular track or cylinder of the disk. It is usually desired that the voice coil motor 19 moves the carriage 18 in radial direction as fast as possible. It should be mentioned, however, that the invention can be practiced in relation to and in disc systems with less stringent requirements.

The carriage 18 carries an optical contrast plate 21 having a grating pattern 21a defined by individual contrasting lines or markers which represent individual tracks or track positions or cylinders for the transducer 17. In addition, the grating plate may have a contrast wedge 21b which can be regarded as an analog indicator for the position of the carriage. The grating 21a is scanned by a stationary transducer 20a to produce pulses as the grating is being moved with the carriage. As the carriage is being moved by the voice coil motor 19, a single pulse is produced into an output line 23 of the pickup device 20 for each track or track position, or cylinder position being crossed by transducer 17. These pulses as produced are set into line 23; they are also frequently referred to as detent pulses.

The desired position of the transducer 17 is in each instance determined by the command and control unit 10 which, of course, receives its information and commands from within the computer system to which this particular disc file pertains. In particular, it is assumed that the command unit 10 furnishes a so-called cylinder difference, that is, a train of pulses or step pulses which in one form or another may present the cylinder difference, i.e. the number of tracks across which the transducer 17 has to be moved from its current position to the desired position. In this particular instance, now it is assumed that an interface line 24 from the control or command unit 10 provides a series of pulses equal in number to that cylinder difference.

It can thus be seen that for each new seek command which the command or control unit 10 is to carry out a number of pulses will be issued into the command line 24, in response to which the motor 19 is to move the carriage 18 and transducer 17 to a new cylinder position. Pursuant to that movement, the feedback line 23 will receive a number of pulses which must equal the number of step pulses which the drive has received via line 24.

The motor 19 is under control of a control circuit 25 being an amplifier which, in turn, is controlled by a combined command and feedback control circuit. The amplifier 25 receives a polarity control signal which is a direction signal fed from command unit 10 via the interface to the drive. The signal switches the amplifier 25 appropriately so that voice coil motor 19 will be actuated to move in the right direction.

A transducer 20b scans the contrast wedge portion 21b of optical transducing plate 21b to provide an analog signal representing positions of carriage 18 and transducer 17. This analog signal is fed to a differentiating circuit 26 deriving a rate or speed signal from the position signal as furnished by transducer 21b. This arrangement 20b, 21b, 26 must be understood generally to represent a tachometer type feedback which furnishes a speed or velocity signal representing the instantaneous speed of the voice coil motor 19 and, of course, of the carriage 18.

A summing point 27 receives the feedback — velocity signal from circuit or device 26. In addition, the summing point receives a speed command signal from a velocity profile generator 28. Generally speaking, the voice coil motor 19 is feedback controlled in accordance with the velocity profile signal from the function generator 28 and will stop when the velocity command from generator 28 is zero. Zero output from generator 28 makes sure that the motor driven carriage 18 is halted when the transducer 17 is above the desired track.

For purposes of fine position control a circuit 29 extracts a position signal from the line 23, whereby it is assumed that in any instance the signal level in line 23 represents the actual position of the transducer 17 vis-a-vis a particular track. The circuit 29 receives a suitable reference signal and its output is an error signal for further control and is applied as such to the summing point 27, thereby establishing a fine position control for motor 19 via the circuit 25.

As stated, the entire circuitry is designed so that the velocity profile and speed command signal from circuit 28 is zero when and only when the transducer 17 has arrived in the new cylinder and track position. Accordingly, the circuit 28 has a basic input the parallel output of an up and down counter 30, which counts the step pulses derived from the command line 24, for example, in upcounting fashion, while detent pulses from line 23 are used to count the counter 30 down, so that the count state zero in the counter 30 is representative of the fact that the transducer 17 must have, at least approximately, arrived at the desired cylinder position, and the fine position control can now take over.

The particular circuit to be described in the following, has as its primary function the task of accepting asynchronously received detent and step pulses. It will be appreciated that, for example, by operation of the command unit 10 the pulses 24 will arrive at a constant rate while, on the other hand, the detent pulses occur highly irregular and are of very irregular configuration. As long as the voice coil motor 19 moves the carraige 18 at a very low speed, the detent pulses are of long duration and occur rather far apart. This is particularly true initially as the motor just started out, and it is also true when the motor 19 is about to stop. In between, however, motor 19 will move at a comparatively high speed, and the detent pulses will occur in line 23 at a rather fast rate. The proper track and cylinder will, however, register with transducer 17 only when none of the pulses and none of the detent pulses are missed in the counting operation.

As far as the counter 30 is concerned, it is completely unforeseeable when any up-count pulse occurs in relation to any preceding, succeeding or even concurring down counting pulse. It is an inherent function of such counters that they cannot accept up and down count pulses simultanously, so that a sorting process has to take place in the input circuit for the counter 30 to make sure that, in fact, up and down pulses do not occur simultanuously.

The circuit to be described next includes basically three branches. Two branches, respectively, process the step and detent pulses, to form count pulses which will never occur simultanuously, while the third branch provides for that control and sorting function.

Turning now to details of the branch that is connected to the interface line 24, it includes a file select, positive OR gate or negative AND gate 31 which is enabled by a device select signal in an interface line 13 if the particular drive is the one which is to be accessed.

It should be noted that for multiple drives in the system line 24 issues step pulses to all drives, but only the selected one will accept them.

The step pulses are fed from the gate 31 to a NAND gate 32 which is unblocked only during certain periods as will be explained more fully below, and, if enabled in that fashion, the gate 32 provides preset pulses to a flip-flop 33. In addition, the output of gate 31 is applied to the clear input of flip-flop 33 so that at the end of a step pulse flip-flop 33 will be cleared with certainty and will be held to the reset state until the next step pulse.

The flip-flop 33, when set (Q output) will, under certain conditions, issue a trigger pulse to a monostable device 35 provided a NAND gate 34 permits such passage. The output of gate 31 serves as a blocking signal for gate 34, in that the trigger signal for monostable 35 can occur only after the trailing edge of a step pulse in line 24. The monostable device 35 furnishes process pulses serving as count pulses of a certain duration. These process pulses will be more particularly called step-count pulses. They are distinguished from the step pulses themselves in line 24 but there will always be one, but only one, step-count pulse following a step pulse. It can be expected, as a rule, that these step-count pulses are of shorter duration than any of the step pulses in line 24, but that is not essential as will be developed more fully below. The step count pulses are applied to the counter 30, for example, to serve therein for upcounting.

The second branch includes analogously a NAND gate 42 which is open only during a certain period and receives, in addition, the detent pulses from line 23 to serve as preset pulses for a flip-flop 43. In addition, the signal in line 23 is applied to the clear input of flip-flop 43, to reset the flip-flop following each detent pulse and to hold the flip-flop to the reset state until the next detent pulse.

The set output (Q output) of flip-flop 43 is fed via an AND gate 44 to a monostable device 45. The monostable device 45 will be triggered by an upswing in the output of gate 44 and that upswing cannot occur prior to the end of a detent pulse in line 23 because the detent line signal level serves as gating signal for gate 44. The output pulses of gate 44 are also process pulses. They are of similar duration as output pulses (step count pulses) from the monostable device 35, but they are fed to the down count side of input counter 30. The process pulses from device 45 will, in the following, be identified more particularly as detent count pulses whereby for each detent pulse one, and only one, detent count pulse is produced after a detent pulse has occurred.

A flip-flop 41, constituting the essential element of the third branch of the circuit, receives the step count pulses from the monostable device 35 as clock pulses. In addition, it receives a preset pulse from the output of select gate 31. The D input (or clocked set input) of flip-flop 41 is grounded so that the flip-flop is reset with each clock in the absence of a preset signal. Thus, flip-flop 41 receives and stores each step pulse from line 24 provided the particular drive has been selected; the flip-flop 41 is reset by the resulting step count pulse. The $\bar{Q}$ output of flip-flop 41 could be termed a blocking signal.

It should be noted that the specific implementation illustrated in the logic circuitry is by way of example only, the use of particular logic gates may be convenient because of packaging and availability of multi-purpose logic chips. One may use other types of gates if the available chips prove to be more conveniently usable with a different type of logic. This is generally true with regard to packaged multi-element, multi-purpose logic readily and immediately available in may configurations.

The circuit as described thus far, particularly as far as the acceptance and rejection of counting signals is concerned, will operate as follows. The normal resting or idle state of the circuit is as follows. The signal levels in lines 23 and 24 are high, so are the two inputs for the counter 30 as it is assumed that counting requires negative input signals and counting is effected by the upsweep from a negative level to the normal or high input level. Flip-flops 33 and 43 are in the set state, the Q outputs are high accordingly. Flip-flop 41 is reset and its output is high accordingly. The NOR gate 31 provides a high output. Accordingly, all the inputs to the NAND gates 32 and 42 are high, the outputs are low.

FIG. 3a describes the signal sequence in the case of a normal step pulse in line 24. The pulse from gate 31 is a negative going signal and clears (resets) flip-flop 33 while driving gate 32 to a high output in preparation of setting the flip-flop 33 when the production of a step count pulse is desired. The flip-flop 33 is reset, and the output of gate 34 goes positive and stays so for the duration of the set state of flip-flop 33.

At the trailing edge of the normal step pulse, the signal levels at the gate 32 goes down, sets flip-flop 33 so that the output of gate 34 goes down accordingly. The down swing of the output signal from gate 34 is used to trigger the monostable device 35 which issues a step counting pulse as shown in the fifth row in FIG. 3a. With the end of the counting pulse, counter 30 changes state in an upcounting fashion.

Quite analogously, a normal detent pulse is converted into a down counting pulse as follows. The detent pulse as shown in the first row of FIG. 3b is a negative going signal in line 23 causing the output of the gate 42 to go up, the gate is not blocked at that time. In addition, the signal in line 23 clears the flip-flop 43 and the output gate 44 prepares to provide the trigger signal to the monostable device 45. Device 45 is triggered particularly with the trailing edge of the signal from gate 44, as it swings up at the end of the detent pulse. Accordingly, a down counting pulse is applied to the appropriate terminal of counter 30, and with the end of the detent counting pulse, the counting state of that counter has changed down by one unit.

Thus far it has been described that the step and normal detent pulses do not interfer with each other in any manner whatsoever, and if, for example, normal step pulses and normal detent pulses are strictly interspersed, that would be the normal state of operation. Accordingly, the step pulses are to be counted up in the counter 30 and converted into a velocity profile signal issued from the generator 28 to serve as a command signal in the feedback loop for the voice coil motor 19. As the motor starts, detent pulses are produced and the counter counts down, modifying the velocity profile accordingly until the velocity command signal from the unit 28 is 0 which occurs when the number of detent pulses produced equals the number of step pulses previously applies.

As outlined above, the circuit is, however, designed to permit the sorting of pulses should they overlap. With this we turn to FIG. 3c. The first two rows of that signal diagram show, respectively, a step pulse whose end overlaps with a detent pulse in that, particularly, the lead edge of the detent pulse occurs during the step pulse and the trailing edge of the latter follows shortly thereafter. In this particular instance where the leading edge of a step pulse occurs prior to the detent pulse, the up counting pulse forming branch is not affected by that detent pulse. Thus, flip-flop 33 is reset because the low level output of gate 31 forces a low clear input for the flip-flop and its Q output goes down accordingly. Since the trailing edge of the step pulse occurs before the trailing edge of the detent pulse of line 23, the output of monostable device 45 is high so that the gate 32 can recognize immediately, the upswing of the signal level in 31 on the trailing edge of that step pulse, forcing the output of gate 32 down and flip-flop 33 is preset accordingly. Thus, the output signal level of gate 34 goes down and an upcounting pulse is produced by device 35. The situation is different for the detent pulse. The step pulse forced the flip-flop 41 into the set state, its $\overline{Q}$ output is therefore low. The low $\overline{Q}$ signal, as applied to gate 42, will prevent the gate 42 from producing a downswing signal as long as flip-flop 41 is set. Flip-flop 41 will be reset only with a trailing edge of the clock signal it receives which is the output of the monostable device 35. Thus, the end of the step count pulse has to be waited for. The trailing edge of the detent pulse is shown to occur during that count upsignal 35 and, therefore, does not immediately effect the gate 42. On the other hand, gate 42 is prepared by the end of the detent pulse to change its output (downswing) as soon as flip-flop 41 is set. This occurs when the monostable device 35 returns to the stable state whereupon flip-flop 43 is forced to set state and the output of gate 44 goes up. Thus, the down counting pulse is produced by the monostable device 45 somewhat delayed from the trailing edge of the detent pulse and right after the upcount pulse. An overlap has been avoided and the production of the down counting detent pulse was delayed until the up counting was completed.

Turning now to FIG. 3d, the signal and pulse diagram illustrates a variety of situations. In the left hand portion, it is presumed that a rather long detent pulse is present in line 33 which is a situation quite normal following the beginning of a seek operation as described in which the response of the voice coil motor is still fairly slow. On the other hand, it is assumed that step pulses occur at a rather rapid rate. In particular, it is assumed that two step pulses occur, one during the detent pulse, that is to say line 2 of FIG. 3d shows a first step pulse, beginning well after the leading edge of the detent signal and terminating well ahead of the trailing edge of the detent pulse. A second step pulse is, however, assumed to straddle the trailing edge of the detent pulse.

It follows that the first step pulse is being processed in a normal fashion. In other words, the fact that the signal level in line 23 is down, and has prepared the branch 42 through 45 for responding to the trailing edge of the detent pulse whenever it occurs, has no effect on the processing of a normal step pulse so that the up count step pulse will be produced in a normal fashion.

The flip-flop 41 has been set with the onset of the step pulse. Flip-flop 41 will be reset by the up count pulse from monostable device 35, particularly the trailing edge thereof. The reset output ($\overline{Q}$) of flip-flop 41 blocks of the gate 42 of the duration of its set state in that gate 42 will not change its output on the trailing edge of the detent pulse as long as flip-flop 41 is set. Since the detent pulse did not end during this first step pulse, nothing transpired in the detent pulse branch; the first step pulse initiated a counting pulse 35 without delay and without causing any delay in the detent pulse branch.

The situation is different for the second step pulse in the illustrated sequence (line 2 of the diagram in FIG. 3d) which, as already mentioned, straddles the trailing edge of the detent pulse. As can be seen from the second and third lines in FIG. 3d, the $\overline{Q}$ signal level furnished by flip-flop 41 goes negative again on the leading edge of that second step pulse, and that leading edge occurs prior to the trailing edge of the detent 23 signal. Since the signal level in line 23 is still down on the leading edge of this second step pulse, the latter is being processed in the second branch 32, 33 and 34, just as before. The fact that the signal level in line 23 goes up doing this second step pulse has no effect on the output levels of circuits 32, 33 and 34. Therefore, in spite of this earlier occurrence of the trailing edge of the detent pulse, the monostable circuit 35 produces undelayed an upcounting pulse ignoring therefore this upswing in the signal level of line 23.

The situation is different as far as the detent branch in the circuit is concerned. The trailing edge of the detent pulse as it arrives at the gate 42 finds the gate blocked by operation of the set state of flip-flop 41. Therefore, the flip-flop 43 will not yet be set and the output level of gate 44 remains low. This situation will change when the monostable device 35 returns to its normal or stable state as that edge resets flip-flop 41. Also, at this point, upcounting of the counter 30 has, in fact, occurred. Only after the flip-flop 41 has been reset, will the output of gate 42 change its level and delayedly set the flip-flop 43. That change in state results in a signal upswing at the output at gate 42 triggering the monostable device 45 which produces a late count down step pulse.

Therefore, in the situation in which a normal step pulse straddles the trailing edge of a detent pulse, the counting to be carried out in response to the trailing edge of the detent pulse is delayed until the counting to be initiated by the step pulse has been completed.

Turning now to the right-hand portion of FIG. 3d, there is illustrated a particular situation in which, for example, a very short step pulse 31 appears, its leading edge following the trailing edge of a detent pulse 23 but the trailing edge of the step pulse occurs before the end of the process, down counting pulse from 45. Thus, flip-flop 41 is not yet set and gate 42 is not yet blocked before the trailing edge of the step pulse 31 occurs. As the output of gate 42 goes down, flip-flop 43 is set so that a downswing signal level is produced at the output side of gate 44 and a downcounting pulse is produced by the monostable device 45. A subsequent temporary upswing of gate 42, upon setting of flip-flop 41 (on the trailing edge 17 the step pulse 31) is of no avail as to the state of flip-flop 43.

Since it is assumed that the step pulse is shorter than the downcounting pulse, the following has to be observed. The downcounting pulse 45 blocks the gate 32 so that the trailing edge of the step pulse 31 will not set flip-flop 33, only the clear input is removed. The flip-flop 33 will be set, however, on the trailing edge of the downcount pulse 45 which is assumed to occur a little later. This is the function of the gate 32! The trigger pulse for the monovibrator 35, which is the downswing of the output of gate 34, is clearly delayed until the downcounting detent pulse has been completed.

It can, thus, be seen that under all possible circumstances and signal relations the detent and step pulses are counted with certainty, whereby in some instances the order of counting is reversed. The circuit is designed to give up-counting preference (in time) over down-counting and to delay the latter, if necessary, until the former is completed.

It will be appreciated that the operation of pulse sorting does not require the gates 32, if the step pulses are with certainty longer than the counting pulses from the monostable devices. The last sequence of signals described with reference to the right hand portion of FIG. 3d has validity only if the step pulses can be shorter, which, of course, is the more general case.

The invention is not limited to the embodiments described above but all changes and modifications thereof not constituting departures from the spirit and scope of the invention are intended to be included.

We claim:

1. In a disc file system to be connected to a control or command unit issuing and receiving data respectively to be stored on and retrieved from the disc file system, the system including at least one magnetic storage disc and at least one motor driven transducer being radially movable with reference to the disc for alignment with annular tracks of the disc, the unit issuing pulses into a particular control line, the number of pulses issued representing a difference between a current track and a desired track on the disc, the combination comprising:
    means for providing detent pulses representing passage of the transducer across the tracks upon movement of the transducer from a position of alignment with one of the tracks to a position of alignment with a different one of the tracks;
    drive means for controlling the movement of the transducer in response to command signals including halting such movement when the transducer has arrived above the desired track;
    first circuit means connected to said control line to be responsive to the pulses when in said line, and providing a first pulse following the trailing edge of each control line pulse;
    second circuit means connected to said means for providing, to be responsive to said detent pulses when provided, and providing a second pulse following the trailing edge of each detent pulse;
    third circuit means connected to the first circuit means to be responsive to said control line pulse and to said first pulse to provide a blocking signal beginning with a leading edge of each control line pulse and ending with each first pulse;
    fourth circuit means included in said second circuit means and connected to the third circuit means to be responsive to said blocking signal to delay the production of a second pulse on the trailing edge of a detent pulse that occurs during the blocking signal; and
    fifth circuit means connected to receive the first and second pulses for deriving therefrom the command signal to operate said drive means, whereby one or more detent pulses may be produced while the unit still issues pulses into the control line.

2. In a disc file system as in claim 1 including sixth circuit means connected to be responsive to the second pulses to provide a blocking signal for the duration of the second pulse when the leading edge of a control line pulse occurs during a second pulse, for delaying production of a first pulse when the trailing edge of the control line pulse occurs also during the second pulse.

3. In a disc file system to be connected to a control or command unit issuing and receiving data respectively to be stored on and retrieved from the disc file system, the system including at least one magnetic storage disc and at least one motor driven transducer being radially movable with reference to the disc for alignment with annular tracks of the disc, the unit issuing pulses into a particular control line, the number of pulses issued representing a difference between a current track and a desired track on the disc, the combination comprising:
    means for providing detent pulses representing passage of the transducer across the tracks upon movement of the transducer from a position of alignment with one of the tracks to a position of alignment with a different one of the tracks;
    drive means for controlling the movement of the transducer in response to command signals including halting such movement when the transducer has arrived above the desired track;
    a first circuit branch connected to said control line to be responsive to the pulses issued by said unit and producing a first pulse of fixed duration following the trailing edge of each control line pulse;
    a second circuit branch connected to said means for providing to be responsive to said detent pulses when provided and providing a second pulse of fixed duration following the trailing edge of each detent pulse;
    a blocking circuit branch also connected to receive said pulses issued by said unit and providing a blocking signal beginning with the leading edge of each control line pulse and ending with the trailing edge of the respective first pulse produced in response to such control line pulse;
    said blocking circuit branch connected to said second circuit branch, the second circuit branch being additionally responsive to said blocking pulse to delay production of any second pulse until termination of the blocking signal;
    two directional counter means connected to receive the first and second pulses to determine by counting when the number of detent pulses equal the number of control line pulses; and
    means connected to the counter means to derive therefrom the command signal.

4. In a disc file system to be connected to a control or command unit issuing and receiving data respectively to be stored on and retrieved from the disc file system, the system including at least one magnetic storage disc and at least one motor driven transducer being radially movable with reference to the disc for alignment with annular tracks of the disc, the unit issuing pulses into a particular control line, the number of pulses issued representing a difference between a current track and a desired track on the disc, the combination comprising:
    means for providing detent pulses representing passage of the transducer across the tracks upon movement of the transducer from a position of alignment with one of the tracks to a position of alignment with a different one of the tracks;
    drive means for controlling the movement of the transducer in response to command signals including halting such movement when the transducer has arrived above the desired track;
    a first flip-flop connected to receive the detent pulse to change state in response to the trailing edge of the detent pulse;
    a first monostable device connected to the first flip-flop to produce a first pulse of fixed duration in response to and following the trailing edge of the detent pulse;

a second monostable device connected to the control line to produce a second pulse of fixed duration in response to and following said trailing edge of the control line pulse;

a blocking flip-flop connected to the control line and the second monostable device to produce a blocking pulse beginning with the leading edge of a control line pulse and ending with the trailing edge of the second pulse, further connected to the first flip-flop to prevent said changing of the state of the first flip-flop for the duration of the blocking pulse;

two directional counter means connected to receive the first and second pulses to determine by connecting when the number of detent pulses equal the number of control line pulses; and means connected to the counter means to derive therefrom the command signal.

5. The combination as in claim 4, and including a second flip-flop connected to receive the control line pulse to change state in response to the trailing edge of that pulse, the second monostable device being connected to the second flip-flop to produce the second pulse following said change in state of the second flip-flop, and circuit means connected to receive the first pulse from the first device, and further connected to delay any production of the second pulse for the duration of the first pulse if occurring during the trailing edge of said control line pulse.

* * * * *